Patented Feb. 24, 1925.

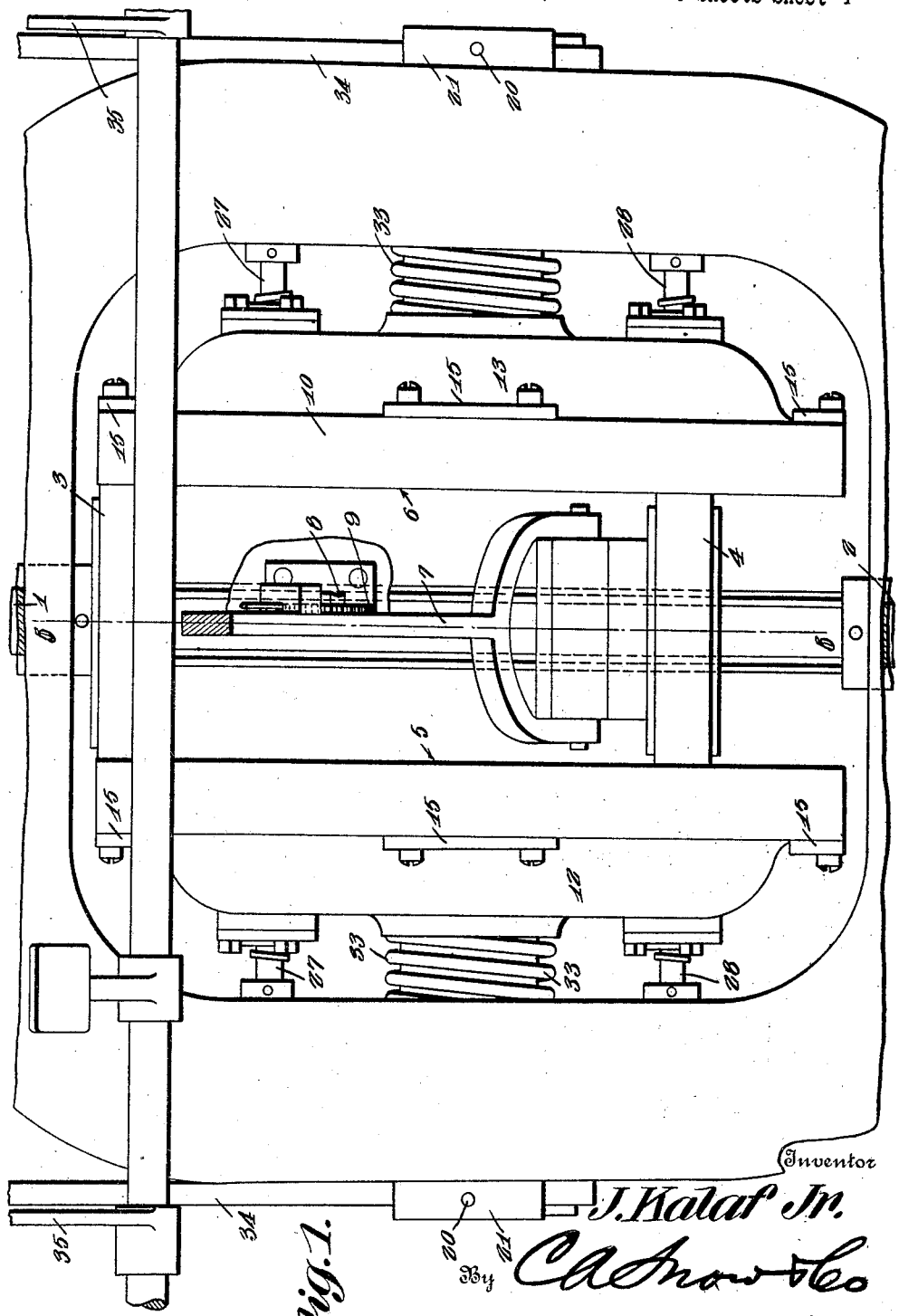

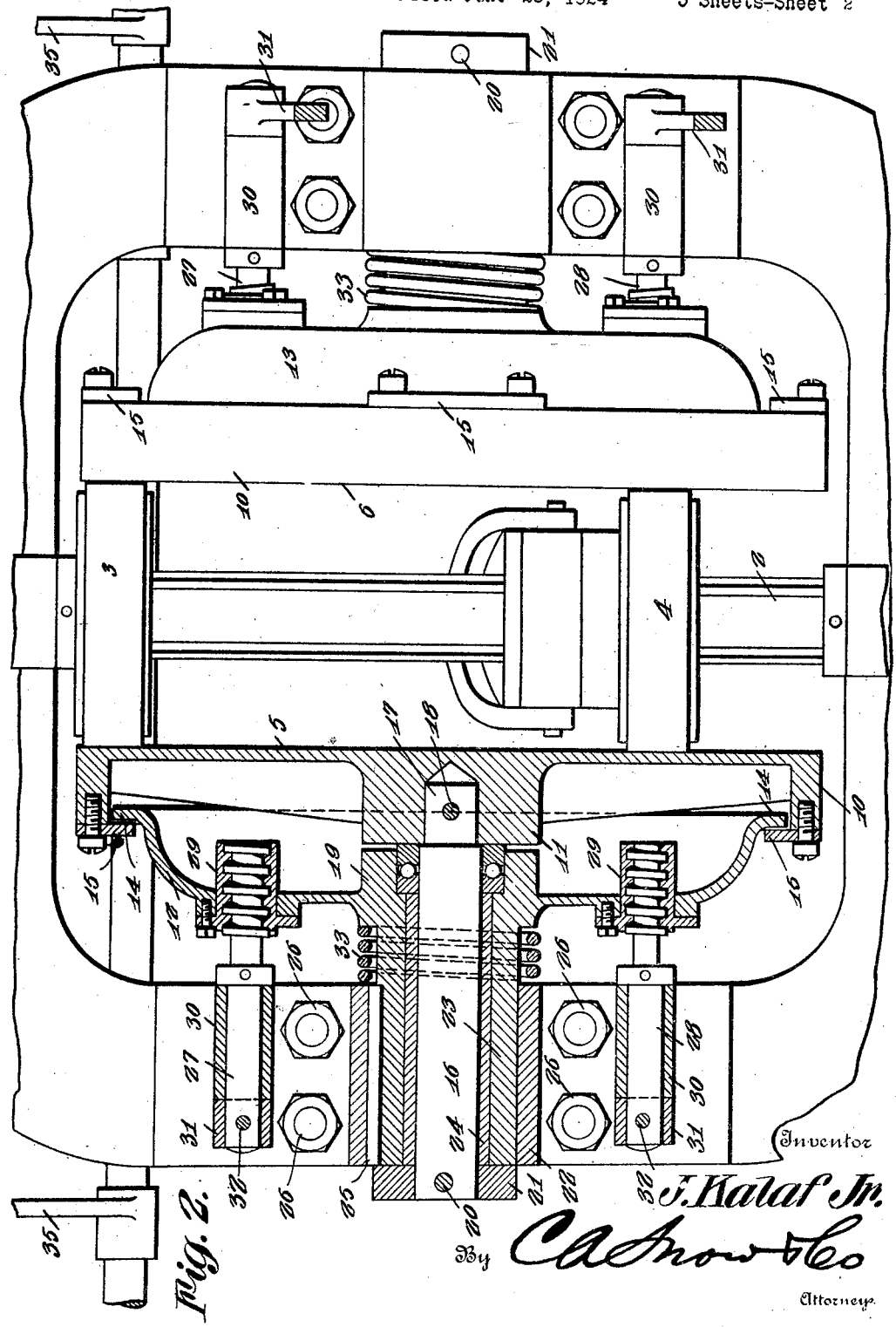

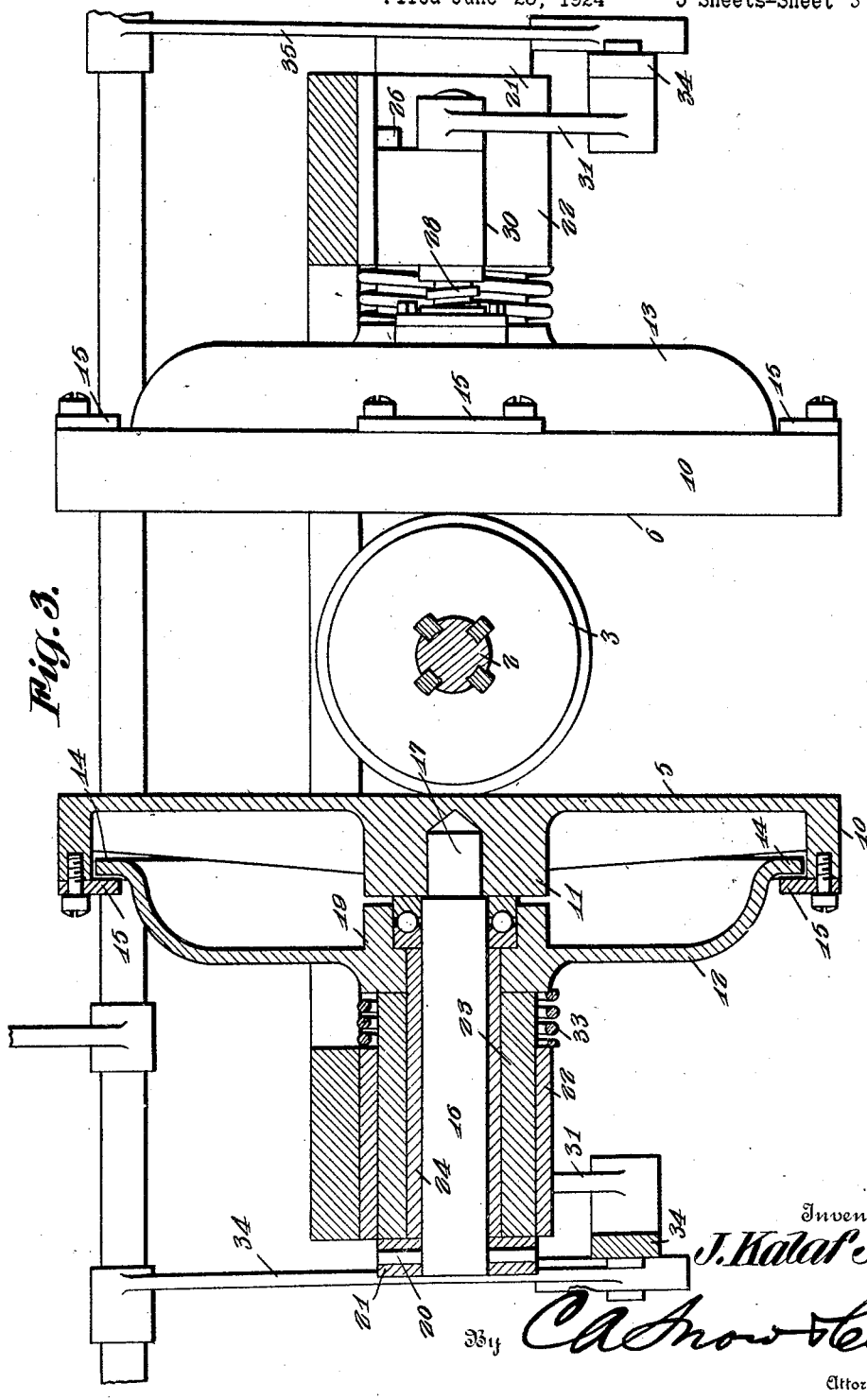

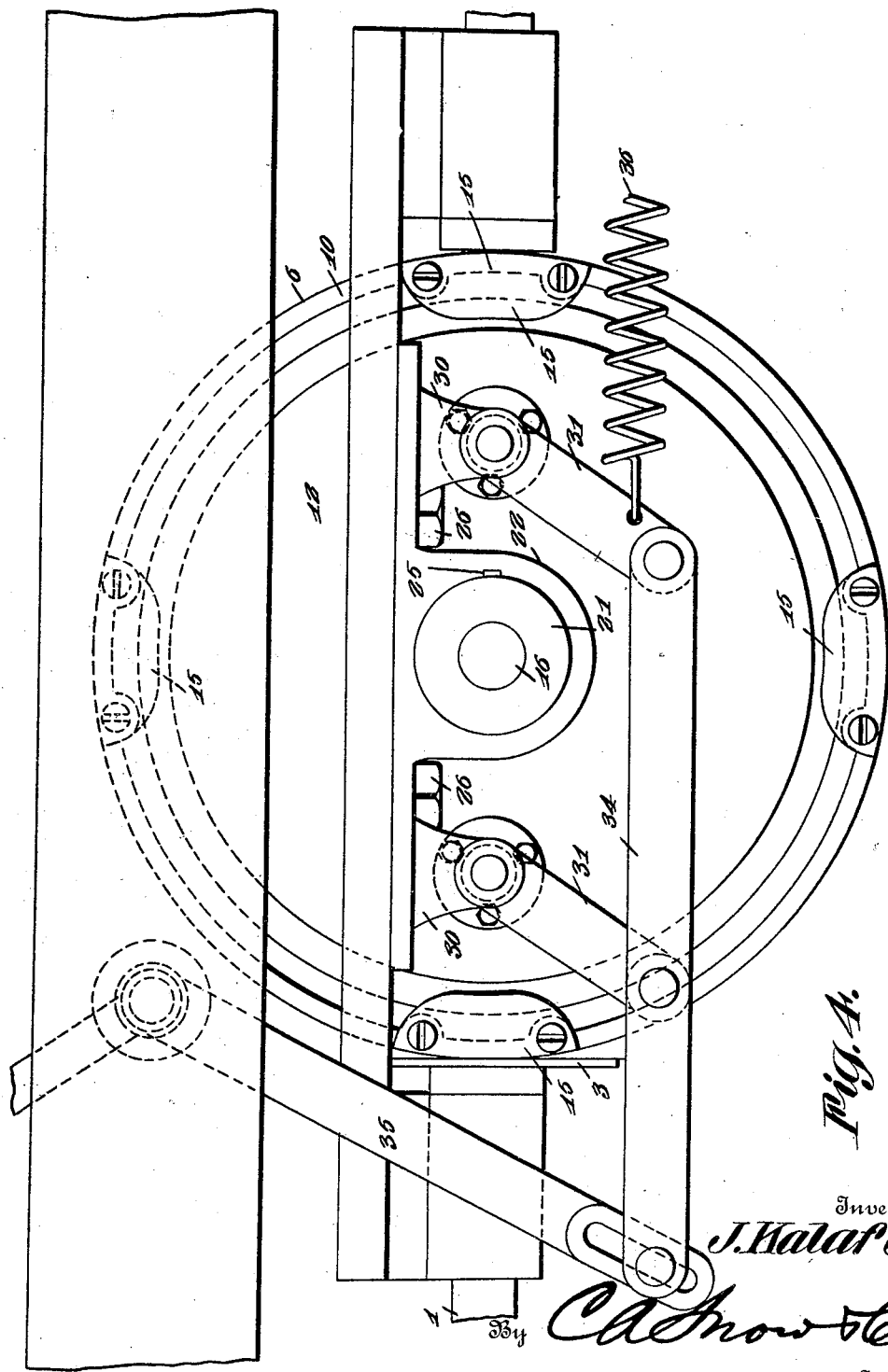

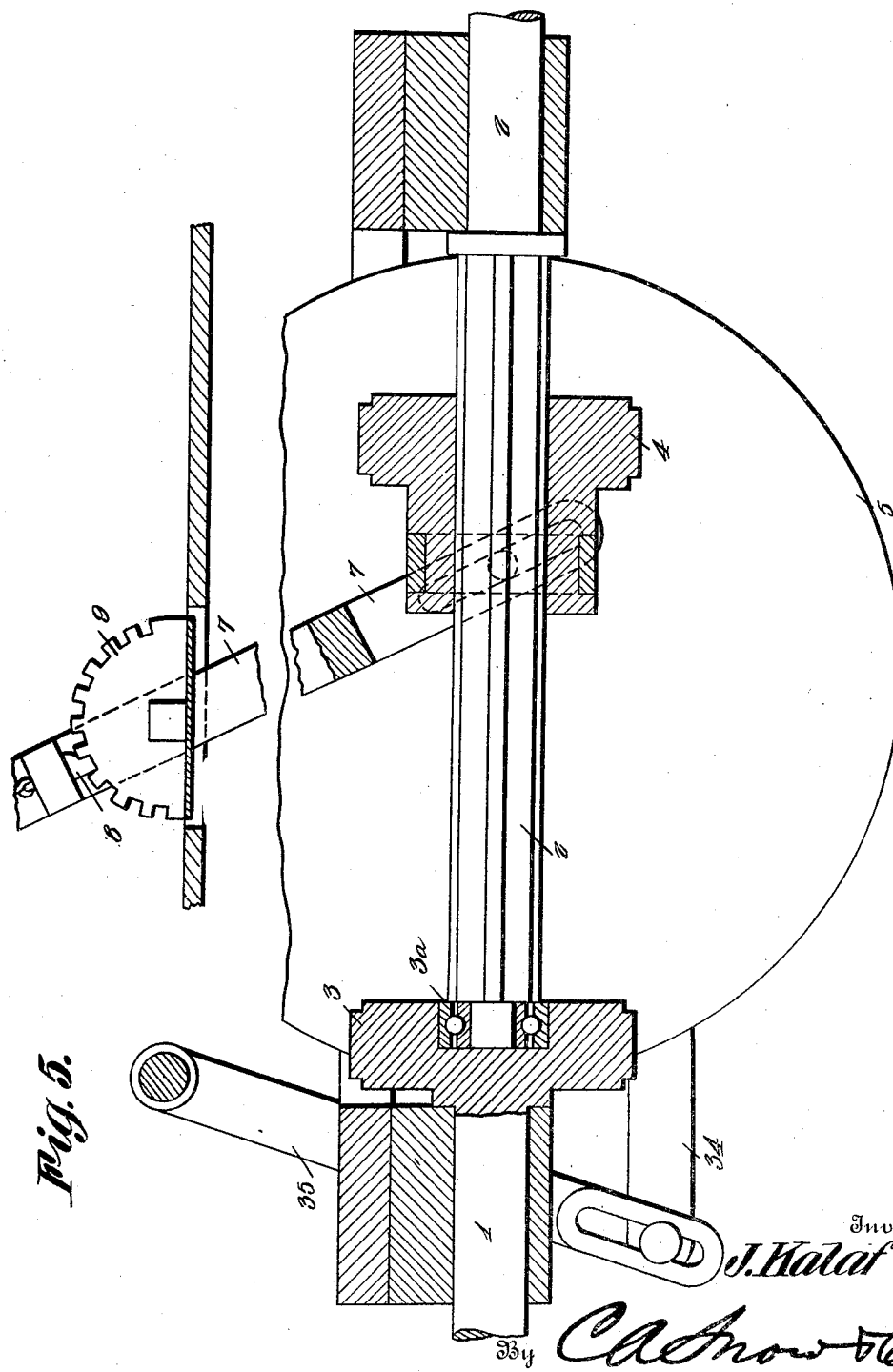

1,527,306

UNITED STATES PATENT OFFICE.

JOHN KALAF, JR., OF META, MISSOURI.

FRICTION GEARING.

Application filed June 23, 1924. Serial No. 721,762.

*To all whom it may concern:*

Be it known that I, JOHN KALAF, Jr., a citizen of the United States, residing at Meta, in the county of Osage and State of Missouri, have invented a new and useful Friction Gearing, of which the following is a specification.

This invention relates to friction clutches for automobile transmissions.

The object of the invention is to provide a clutch of this character which is comparatively simple in construction, easy to operate, and durable and which is so constructed as to avoid vibration and noise.

Another object of the invention is to provide a clutch of this character in which the parts only which perform the principal functions revolve and in which the coupling of the shafts and the desired speed changes and reverse may be effected quickly and reliably without shock to the mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a top plan view of the clutch constructed in accordance with this invention, with parts broken off and in section;

Fig. 2 is a bottom plan view thereof partly in horizontal section;

Fig. 3 is a longitudinal section;

Fig. 4 is an end elevation; and

Fig. 5 is a longitudinal section taken on the line 5—5 of Fig. 1.

In the embodiment illustrated a driving shaft 1 is shown connected by the clutch constituting this invention to the driven shaft 2. The driving shaft has a friction wheel 3 fixed to its rear end in the rear face of the center of which the front end of shaft 2 is mounted to rotate on a ball-bearing shown at 3ª.

A similar friction wheel 4 is keyed to slide on shaft 2 and through two disk-like plates 5 and 6 and the wheel 3 connects shafts 1 and 2 so that shaft 2 may be driven by shaft 1 the speed being controlled by shifting wheel 4 toward and away from the perimeter of plates 5 and 6. The shifting of wheel 4 is accomplished by means of a lever 7 having a pin and slot connection with wheel 4 and adapted to be adjustably secured by means of a spring-pressed dog 8 and a segmental rack 9 such as is usual in devices of this character.

The disks 5 and 6 are equipped with outwardly extending annular flanges 10 which greatly strengthens the disks and each of said disks has an enlarged outwardly extending hub 11 for a purpose presently to be described. Cap-like disks 12 and 13 are designed to cooperate with disks 5 and 6. These disks as shown are convexo-concave with annular flanges 14 extending outwardly and positioned within the flanges 10 of disks 5 and 6. Brakes 15 are carried by the outer edges of flanges 10 of the disks 5 and 6 and overlie the flanges 14 of disks 12 and 13 as is shown clearly at the left of Fig. 2. Any desired number of the brakes 15 may be used. A shaft 16 has a reduced end 17 mounted in the hub 11 of each of disks 5 and 6 and secured thereto by pins as 18. This shaft also passes through the hub 19 of disk 12 and is equipped at its outer end with a pin 20 and a collar 21 to hold shaft 16 against slipping out.

A bushing 22 encompasses a large hollow shaft 23 through which shaft 16 passes and which has a boxing 24 arranged between it and shaft 16. A key 25 prevents shaft 23 from turning and the boxing 22 is secured by means of bolts 26.

Screw shafts 27 and 28 are mounted at each side of the clutch and have threaded connection at one end with sockets 29 carried by disk 12. These shafts 27 and 28 are journaled in suitable bearings 30 and have their outer ends connected with levers 31 which are secured thereto by pins 32.

A heavy coiled spring 33 is mounted on the hollow shaft 23 between the hub 19 of disk 12 and the bushing 22 and exerts its pressure to normally force the hub 19 of disk 12 against the hub of disk 5 whereby pressure is exerted on the wheels 3 and 4 at which time the clutch will be in operation. The only parts of the clutch which revolve when in operation are the following: disks 5 and 6, shafts 16 and wheels 3 and 4 the remaining parts being stationary except that the disks 12 and 13 will yield under the action of springs 33.

The arms 30 and 31 which are fixed at one end to the shafts 27 and 28 are connected by a link 34 to adapt them to move in unison. A lever 35 is connected with the outer end of the link 34 while a coiled spring 36 connects the other end of said link with a fixed member of the chassis and exerts its tension to normally hold the shafts 27 and 28 in the position shown in Fig. 1 whereby the clutch disks 5 and 6 are in engagement with the friction wheels 3 and 4 to connect the driving with the driven shaft.

It is of course understood that the clutch releasing mechanism as described is duplicated at the other side of the clutch and that the lever arms 35 are extended and connected at their outer ends with a lever, not shown, which is positioned for convenient operation by the driver so that the actuation of this lever by the driver will operate simultaneously to turn the screw shafts 27 and 28 at opposite sides of the clutch to move the disks 12 and 13 outwardly against the tension of springs 33 and 36 and through the engagement of flanges 14 and brakes 15 release the disks 5 and 6 from the friction wheels 3 and 4 and throw the clutch into neutral permitting the driving shaft 1 to rotate without affecting the driven shaft 2.

When the clutch is thrown in which occurs on the release of the lever arms 35 the coiled springs 36 operate to turn the screw shafts 27 and 28 in a direction which causes the disks 12 and 13 to move toward each other carrying with them disks 5 and 6 thus bringing said disks 5 and 6 into frictional contact with the wheels 3 and 4.

After the clutch has been thrown into neutral the speed may be changed by shifting the friction wheel 4 toward or away from the perimeter of disks 5 and 6 which is accomplished by means of the lever 7 above described. It is of course understood that reverse of the driven shaft 2 is accomplished by shifting wheel 4 beyond the centers of disks 5 and 6 as is usual in clutches of this character.

The springs 33 not only prevent the wearing of flat faces on the wheels 3 and 4 but avoid vibration and noise in the operation of the clutch.

I claim:—

1. In a friction clutch, the combination with a driving and a driven shaft; of a clutch for connecting said shafts comprising two friction wheels one fixed to the driving shaft and the other keyed to slide on the driven shaft, disks mounted with their flat faces to move toward and away from the peripheries of said wheels whereby said shafts are connected or disconnected, cap-like disks mounted to cooperate with said flat faced disks, internally threaded sockets carried by said cap-shaped disks, screw shafts having threaded engagement with said sockets, and rotatable in opposite directions to move the disks toward and away from the flat faced disks, a lever connected to rotate said shafts in one direction, and a coiled spring connected to force said cap-shaped disks into engagement with said flat face disk.

2. In a friction clutch, the combination with a driving and a driven shaft; of a clutch for connecting said shafts comprising two friction wheels one fixed to the driving shaft and the other keyed to slide on the driven shaft, disks mounted with their flat faces to move toward and away from the opposed edges of the peripheries of said wheels whereby said shafts are connected or disconnected, said disks having outwardly extending annular flanges, shafts to which said disks are fixed, cap-shaped disks engaging said first mentioned disks at the hub portion thereof and having outwardly extending annular flanges fitting within the flanges of the first mentioned disks, brakes carried by the flanges of the first mentioned disks and overlying those of the cap-shaped disks, means to move said cap-shaped disks toward and away from the first mentioned disks and to carry said flat faced disks with them and coiled springs mounted to force said flat faced disks in engagement with said wheels.

3. In a friction clutch, the combination with a driving and a driven shaft; of friction wheels one fixed to the driving shaft and the other keyed to slide on the driven shaft, said shafts being in longitudinal alinement, disks mounted with their flat faces to engage the peripheries of said wheels for connecting the shafts, said disks having rearwardly extending hubs, shafts fixed in said hubs, non-rotatable cap-like disks mounted to slide on said shafts and having hubs engaged with the hubs of the first mentioned disks, said cap-shaped disks having annular flanges fitting in the flanges of the first mentioned disks, brakes overlying the flanges of the cap-shaped disks and carried by those of the flat faced disks, threaded sockets carried by said cap-shaped disks, screw shafts engaged with said sockets, levers connected to turn said shafts for moving the flat faced disks toward and away from the peripheries of the wheel, and coiled springs normally forcing said disks toward said wheel.

In testimony that I claim the foregoing as my own, I have hereto affixed my signature in the presence of two witnesses.

JOHN KALAF, Jr.

Witnesses:
N. J. ROWAN,
ROBERT PRATER.